Dec. 4, 1934.  H. J. CRINER  1,983,168
LIFTER FOR HOT DISHES
Filed Aug. 8, 1932

INVENTOR.
Harry J. Criner

Patented Dec. 4, 1934

1,983,168

UNITED STATES PATENT OFFICE 1,983,168

LIFTER FOR HOT DISHES

Harry J. Criner, Davenport, Iowa, assignor of one-half to A. G. Bush, Davenport, Iowa Application August 8, 1932, Serial No. 627,918

3 Claims. (Cl. 294—34)

My invention relates to a lifter for hot dishes such as pies, cakes, etc., to assist in removing them from an oven without burning the fingers.

The objects of my invention are to provide a simple, easily operable lifting device which will hold a pie tin or other baking dish firmly without marring the pie or cake which it contains and which can be manufactured at very low cost.

I attain these objects by the means illustrated in the accompanying drawing, in which,—

Similar numerals refer to similar parts throughout the several views.

Figure 1:
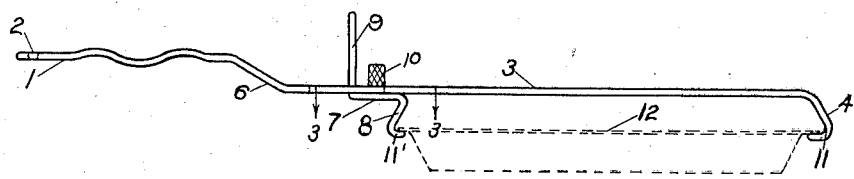
Figure 1 is a side elevation of my appliance showing a pie tin in dotted lines gripped thereby.

My appliance comprises a body, 3, preferably composed of a flat bar of metal of sufficient weight to have the necessary strength and rigidity and having an undulating handle, 1, formed integral therewith which may be arranged in the same line as the body or bent upwardly slightly at 6 as shown in Figure 1.

At the left or rear of the handle, I provide a hole, 2, by which the appliance can be readily hung upon a nail or peg when not in use.

The front end of the bar is bent obliquely downward and forward (4) with the extreme end thereof rebent backwardly to form a finger, 11, that will afford the front or fixed gripping member a firm hold upon the flange.

Just in front of the handle I form a longitudinal slot, 5, in the body bar. A rear gripping member having a body, 7, extending parallel with the body bar, 3, is secured to the body bar adjacent the slot by a screw, 10, which is preferably formed with a knurled head projecting above the bar, 3, by which it can be locked in a given position. The rear gripping member also has an upwardly extending thumb piece, 9, which extends through the slot to afford means by which the thumb of the operator can be applied to move the rear gripping member in either direction longitudinally or to a slight extent transversely of the body, the upwardly projecting portion forming the thumb piece being cut away at the level of the body to permit it to slide within the slot.

This reduced portion, 9', of the thumb piece is made slightly narrower than the width of the slot and the body of the screw, 10, has a diameter considerably smaller than the width of the slot.

Downwardly projecting fingers are bent forwardly at 8 and 8' to afford a grip upon the flange of the pie tin, 12, or other baking dish.

Figure 2:
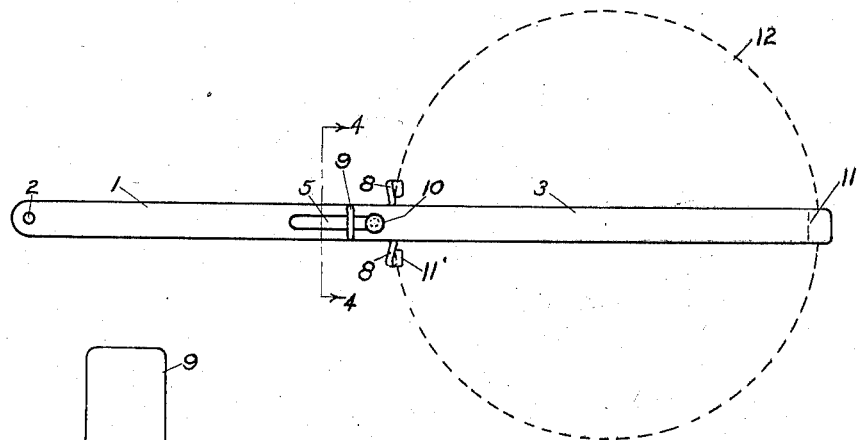
Figure 2 is a plan view.
Figure 4:
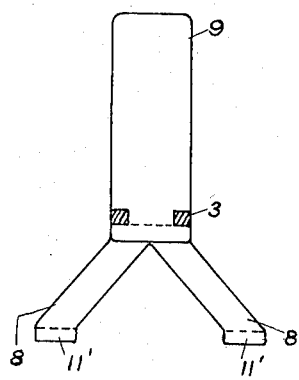
Figure 4 is a rear elevation of the rear gripping member showing part of the body in section on the line 4—4 of Figure 2.
Figure 3:
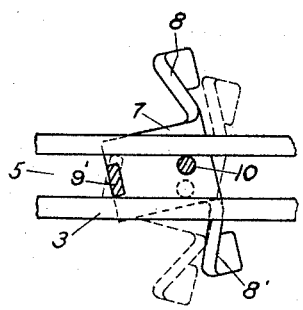
Figure 3 is an enlarged detail of the movable gripping member and body bar showing the gripping member in section on the line 3—3 of Figure 1.

In the operation of my device, the appliance is held in one hand and the movable member moved to the rear by pressure upon the thumb piece, 9. The front gripping member is then placed in position under the flange of the pie tin as shown in Figure 1 and the rear gripping member then moved forward by pressure of the thumb upon the thumb piece, 9, until it grips the flange at the rear of the pie tin as shown in Figure 2.

As it is rather difficult to center a gripping appliance accurately upon a round cake or pie tin and as it is necessary to have a three point suspension to hold such a pie tin securely, I provide the rear gripping member with a pair of fingers, 8, and it is pivoted in the slot, 5, as explained above so that when the rear gripping member is moved forward by pressure of the thumb upon the thumb piece, 9, it will easily conform to the curvature of the adjacent pie tin and both fingers will get a secure grip upon the flange of the pie tin.

When the gripping members are sloped inwardly as well as downwardly, pressing them together has a tendency to lift or raise the dish being lifted so as to cause the body, 3, to contact the top of the pie or cake and thus mar or disfigure it.

In my device, I have sloped the front gripping member forwardly and the rear gripping member rearwardly so that when pressure is applied upon the rear gripping member, the slope of the downwardly projecting portions of these members will have a tendency to force the lifter upwardly or the dish being lifted, downwardly, and thus cause the body, 3, to clear the pie or cake and prevent any marring or disfiguring thereof.

It is obvious that a lifter in the form shown can be manufactured at very low cost as the parts can be stamped out of stock material and no machining is necessary except the thread of the opening for the screw.

It is also obvious that various changes may be made in the material and shape of the handle and in the shape and proportion of other parts without departing from the spirit of my invention and I do not limit my claims to the precise form or proportions shown.

I claim:

1. A pan or pie tin lifter comprising a body bar having a handle formed integral therewith, the front end of the bar sloping downwardly and forwardly with a rearwardly extending finger at the extreme end thereof to form a front gripping member, a vertical slot formed in the bar extending longitudinally thereof, a rear gripping member having a vertical pivot extending through the slot and having a plurality of downwardly and rearwardly extending prongs with forwardly extending fingers at the extreme ends thereof, said rear gripping member being slidable upon the bar and revolvable horizontally within certain limits with said pivot.

2. A pan or pie tin lifter comprising a body bar having a handle formed integral therewith, a front gripping member united to the bar and extending downwardly therefrom with a recurved finger at the extreme end thereof, a vertical slot formed in the bar and extending longitudinally thereof and a rear gripping member having a vertical pivot united thereto and extending through the slot and adapted to slide therein, said rear gripping member having a plurality of downwardly extending prongs with forwardly extending fingers at the extreme ends thereof and being adapted to rotate laterally to a limited extent with said pivot, thereby adjusting the rear gripping fingers to fit the curve of the object to be lifted.

3. A pan or pie tin lifter comprising a body bar having a handle formed integral therewith, a front gripping member united to the bar and extending downwardly therefrom with a recurved finger at the extreme end thereof, a vertical slot formed in the bar and extending longitudinally thereof and a rear gripping member having a vertical pivot united thereto and extending through the slot and adapted to slide therein, said rear gripping member having a plurality of downwardly extending prongs with forwardly extending fingers at the extreme ends thereof and being adapted to rotate laterally to a limited extent with said pivot, thereby adjusting the rear gripping fingers to fit the curve of the object to be lifted, and an upwardly and rearwardly extending thumb piece united to the rear gripping member and extending upwardly through the longitudinal slot at the rear of the pivot.

HARRY J. CRINER.